United States Patent
Hadden et al.

[11] 3,933,641
[45] Jan. 20, 1976

[54] SEWAGE TREATMENT AND RECYCLING SYSTEM

[75] Inventors: Lyall C. Hadden; Charles T. Benjamin, both of Honeybrook, Pa.

[73] Assignee: Environs Engineering Enterprises, Inc., Honeybrook, Pa.

[22] Filed: Mar. 4, 1974

[21] Appl. No.: 447,496

[52] U.S. Cl. ............... 210/205; 210/247; 210/258; 210/260
[51] Int. Cl.² ........................................ B01D 35/00
[58] Field of Search ......... 210/17, 42, 39, 170, 247, 210/248, 249, 242, 260, 259, 411, 456, 503, 205, 258

[56] References Cited
UNITED STATES PATENTS

| | | | |
|---|---|---|---|
| 663,547 | 12/1900 | Lemley | 210/456 X |
| 681,884 | 9/1901 | Monjeau | 210/17 |
| 988,391 | 4/1911 | Shillington | 210/503 X |
| 2,247,377 | 7/1941 | Hill | 210/503 |
| 2,442,432 | 6/1948 | Prager | 210/17 |
| 2,545,301 | 3/1951 | O'Donnell | 210/242 |
| 3,126,333 | 3/1964 | Williams | 210/411 X |
| 3,306,447 | 2/1967 | Medeiras | 210/170 |
| 3,327,855 | 6/1967 | Watson et al. | 210/260 X |
| 3,767,051 | 10/1973 | Thompson | 210/260 |
| 3,790,370 | 2/1974 | Lalahoettp | 210/42 |

FOREIGN PATENTS OR APPLICATIONS

| | | | |
|---|---|---|---|
| 256,316 | 8/1926 | United Kingdom | 210/39 |

*Primary Examiner*—Theodore A. Granger
*Attorney, Agent, or Firm*—Joseph M. Corr

[57] ABSTRACT

A sewage treatment and recycling system is disclosed wherein effluent is initially treated in a septic tank and then flows over a perforated splash pan to be distributed evenly over a removable filter. The filtered effluent then passes through a second filter and into a holding tank from where it is pumped to a water tank and chlorinated before being sprayed over the land surface or used for other purposes.

6 Claims, 5 Drawing Figures

SEWAGE TREATMENT AND RECYCLING SYSTEM

BACKGROUND OF THE INVENTION

This invention relates to a sewage treatment system. More particularly the invention relates to a system which purifies sewage effluent to an extent which permits the purified effluent to be used for a variety of purposes and even renders the effluent potable.

In those areas which do not have a public sewage system, it is common for residences, commercial establishments or other buildings to have individual sewage treatment systems. Each of these systems generally comprises a septic tank having different compartments in which the solid waste is broken apart and dissolved to a partially purified fluid by the interaction of the aerobic/anaerobic bacteria balance. Additionally, the scum and grease which collects on top of the fluid is attacked and partly decomposed by aerobic microorganisms which are present in the septic tank in a relatively small amount. Suitable means are provided to permit the treated effluent to flow by force of gravity from the septic tank into a drainage field or directly into a river or stream.

However, since conventional septic tanks do not have an adequate aerobic/anaerobic bacteria balance, the treated sewage still contains significant amounts of coliform while having a high biological oxygen demand. As such the effluent is a major source of pollution of the lakes, streams and subsurface waters. In turn, the effluent can be a health hazard to a community as well as being a hazard to the environment and ecology.

Generally, conventional sewage systems of the type under discussion require suitable drainage means to function properly. When a system is installed in the ground which has poor percolation it is extremely difficult to obtain adequate drainage of the treated effluent. The results of this can cause not only great inconvenience to the people using the system but also can pose a significant health problem.

The pollution and health hazards associated with conventional septic systems can be attributed to the fact that the effluent is either discharged directly into a stream or drained into a subsurface drainage field which normally is so far below the land surface as to prevent further natural bacteriological treatment of the effluent. In such systems the effluent is considered useless waste. The present invention not only solves the pollution and health problems of the conventional sewage systems but also provides an effluent which has a variety of uses such as for irrigation and is even potable.

SUMMARY OF THE INVENTION

It is therefore a primary object of the invention to provide a sewage treatment system for residential or commercial application wherein the treated effluent can safely be used for a variety of purposes, such as irrigation. It is a further object of the invention to provide a system wherein the treated effluent is potable and is not a source of pollution.

It is another object of the invention to provide an economical, self contained sewage treatment system wherein the sewage is treated in successive steps and the remaining effluent is low in biological oxygen demand and coliform.

Also, a purpose of the invention is to provide a system wherein sewage is treated by aerobic bacterial action resulting in a breakdown of anaerobic bacteria and is subsequently filtered to become a useful effluent.

It is a further object of the invention to provide a sewage treatment system which has a unique filter for cleaning the effluent and rendering it safe for use in irrigation or plumbing systems or other suitable applications.

It is another object of the invention to provide a sewage treatment system in which the effluent is chlorinated prior to being discharged into the surrounding environment or used for other purposes.

Another object of the invention is to provide a sewage treatment system in which a novel means is provided for evenly distributing the effluent over a filter after passing through a septic tank, thereby permitting uniform and complete filtering of the effluent.

There and other objects of the invention will be apparent from the following description of the invention which basically comprises a septic tank having suitable compartments for initially treating the sewage by aerobic bacterial action. The effluent then flows from the septic tank onto a perforated splash pan which is designed to distribute the effluent evenly over the surface of a first filter which preferably is removable. The effluent flows through this first filter and then flows through a second filter in which the coliform and biological oxygen demand are reduced to acceptable levels. This filtered effluent then flows into a holding tank from which it is pumped to a pressure tank. Prior to entering the pressure tank the effluent is chlorinated and then discharged or pumped to the surface. The treated effluent is now potable water and can be used in irrigation or plumbing system of the facility to which the system is connected.

DESCRIPTION OF THE PREFERRED EMBODIMENTS

Figure 1:
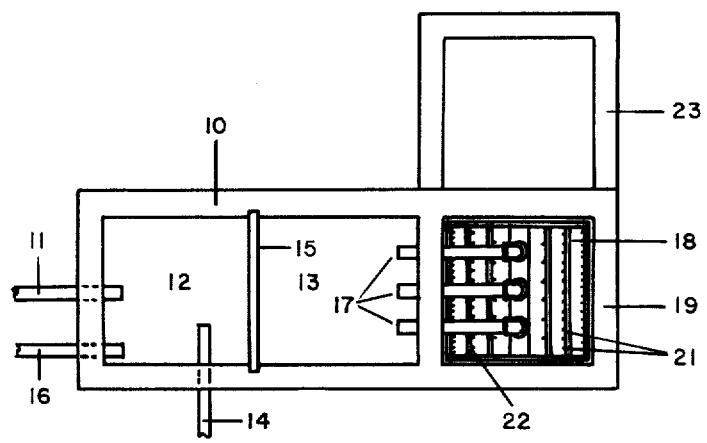
FIG. 1 is an exposed top view of the structure comprising the invention.

Referring to FIG. 1 there is shown a top view of the main structural elements of the sewage treatment system. Container 10 is an aerated septic tank having an inlet passage 11 which is connected to the sewage drainage line of a building when the system is installed. Sewage therefore drains into septic tank 10 through line 11 and flows from compartment 12 to compartment 13 in the normal manner while undergoing reduction and dissolution by aerobic/anaerobic bacterial action. As is well known the sewage contains anaerobic bacteria which thrive in the absence of oxygen but must be killed since they carry diseases. Therefore aerobic bacteria which thrive in the presence of oxygen and are present naturally in air are introduced in order to attack the anaerobic bacteria. In this regard there are present in air microorganisms known as phagocytes which ingest and destroy the anaerobic microorganisms. This action of the phagocytes is referred to herein as aerobic bacterial action. The air inlet passage 14 is provided near the bottom of the septic tank to permit the necessary aeration of the tank for aerobic bacterial action. The air introduced via inlet 14 is forced from an air compressor and acts to stir the sewage to accomplish more efficient and more complete bacterial action as well as to keep the sewage in motion in moving from compartment 12 to compartment 13. Vent 16 is provided to remove obnoxious odors in the normal manner as well as to maintain proper pressure distribution within the tank so that the sewage is free to flow in the tank. The septic tank is preferably constructed of concrete or steel since it is important that no leakage from the tank occur.

Outlet pipes 17 are provided near the top of the end wall of compartment 13. Baffle 15 acts to prevent solids from passing into compartment 13 so that only effluent which is relatively free of solids flows beneath the barrier from compartment 12 into compartment 13. Therefore, as the sewage flows through the septic tank 10 and its level rises, the effluent near the top in compartment 13 is generally free of solids and therefore is ready for subsequent treatment. Three pipes 17 are provided although more or fewer pipes can be used with the number being determined by the size of tank 10 and other structural considerations. Upon reaching the level of the outlet pipes 17 the effluent flows out of the tank 10 and onto the splash pan 18 located near the top of container 19 which serves as a filter tank. The splash pan is perforated with a series of holes 21 and has baffles 22 to control the flow of effluent over the pan's surface. Further description of the construction and operation of the splash pan is left to subsequent Figures. Extending out from below filter tank 19 is container 23 which serves as a fluid collecting and holding tank, both of which are also preferably constructed of concrete or steel to assure no leakage of effluent.

Figure 2:
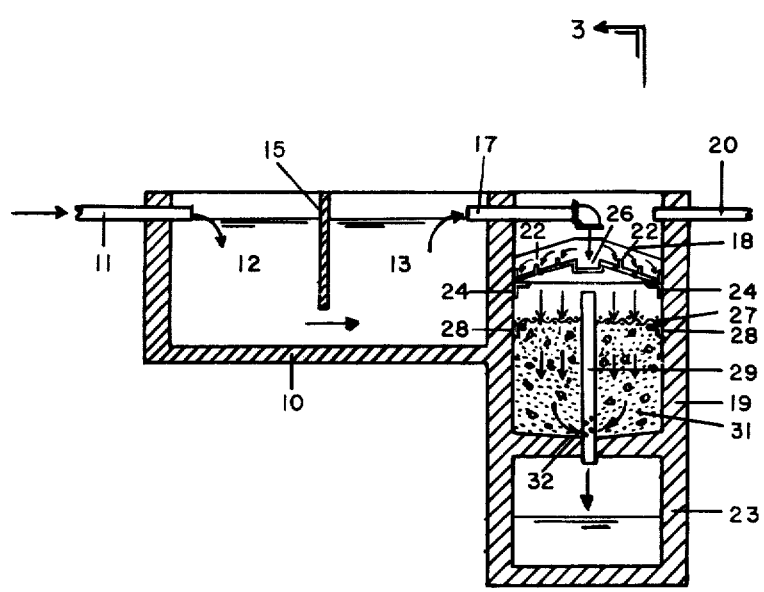
FIG. 2 is a side elevational view of the structure.
Figure 5:
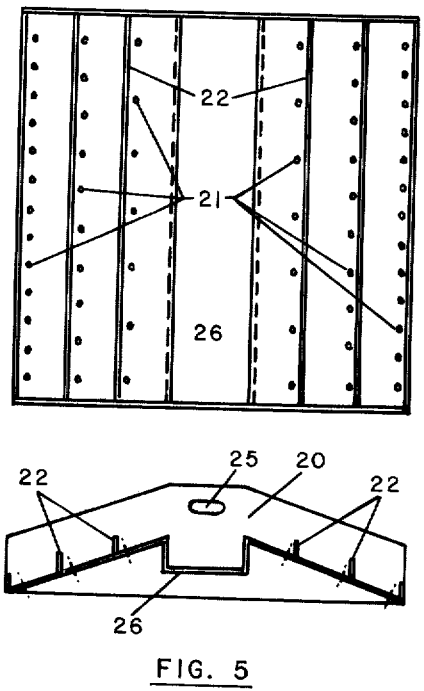
FIG. 5 is a more detailed view of the splash pan used for distributing effluent over the system's filter.

Turning now to FIG. 2 the arrangement of the filter system in tank 19 is illustrated. The outlet pipe 17 from tank 10 is shown positioned above splash pan 18 which is supported in tank 19 by brackets 24 attached to the side walls of the tank. The details of the splash pan are viewed better in FIG. 5 where it is shown that the splash pan is shaped like a hood having two end walls, one of which is shown at 20 with opening 25 for holding the pan. The effluent flowing from pipe 17 first collects in trough 26. After the trough fills, the effluent flows over the side to the first baffle 22. Holes are provided in the pan just before the baffle, permitting the effluent to trickle through. If a large volume of effluent is discharged from pipe 17 the effluent will flow over the baffles and be distributed across the entire surface of the splash pan. Holes are provided in the splash pan in front of each baffle with a greater number of holes per surface area being successively provided in front of the baffles as one progresses from the center of the pan out to its edge. Therefore the baffle adjacent trough 26 has the fewest holes in front of it while the baffle nearest the wall of tank 19 has the most. These baffles thus control the flow of effluent across the surface of the splash pan while the holes permit the effluent to trickle over the surface of a first filter 27. The particular arrangement of holes, as well as the arrangement of baffles, described and shown as being preferred are not intended as limitative of the splash pan construction or of the invention since other arrangements are readily contemplated. It is apparent that the size and number of holes depend upon the size of the pan 18 and the overall installation. However, the holes should not be so large that all the effluent flows through the first set of holes and not get past the first baffle 22 since the effluent would then not be evenly distributed over the filter.

Filter 27 comprises a perforated support member, preferably a screen, which is supported at either end by brackets 28 mounted to the side walls of tank 19 and is laid across the interior of the tank. A preferred feature is that this filter be removable and be periodically replaced. Access to the removable filter 27 is gained through removing the cover on filter tank 19 and lifting the splash pan 18 off brackets 24. Proper clearances are built into the system so that pipes 17 won't prevent removal of pan 18. The cover on filter tank 19 is not shown nor is the cover on septic tank 10 so that the interior of the system can be better illustrated. However, when the system is installed in the earth, a concrete or other suitable cover is placed over both tanks 10 and 19. A removable hatch is provided in the cover over filter tank 19 in order to permit removal of filter 27 as just described.

Filter 27 preferably is multilayered and serves the primary purpose of neutralizing the urea in the effluent and removing some of the larger suspended solids. The first layer on top of the screen is fiber glass wool which prevents the other filter materials from going through the screen. On top of the fiber glass there is placed a layer of anionic/cationic resins which act to remove metallic ions from the effluent if such ions are present in the effluent to such a degree that their removal is desirable. Finally, the top layer consists of suitable organic materials which neutralize the urea. These organic materials are periodically replaced to assure proper filtration under operating conditions and therefore the filter has been designed to be removable. A rather inexpensive and readily available substance to serve as the organic filter agent is tree leaves which preferably are ground up and spread across the screen to a depth of approximately 4 inches. Although leaves have been found suitable for this purpose other suitable materials include ground wood products such as wood chips or sawdust. The important point is to select a suitable organic agent capable of neutralizing the urea and such materials are readily known to those skilled in the art. Tree leaves are used since they are an abundant and natural source of organic acids such as tannic acid, ascorbic acids, etc., depending on the type of leaf.

It is also desirable that aerobic bacterial action take place in the area of the filter 27. Therefore air is introduced into the open space above the filter and below the splash pan 18 primarily by open ended pipe 29 which as shown begins above the filter 27 and terminates in holding tank 23. As will be discussed later tank 23 is aerated by suitable means and the air in this tank is able to pass up through pipe 29 and into the open space above filter 27. Since the upper open end of this pipe is positioned immediately beneath trough 26 in which there are no holes, the possibility of effluent passing directly into holding tank 23 via pipe 29 is avoided. Vent 20 is provided to remove residual odors and to equalize pressure in filter tank 19.

After flowing through filter 27, the effluent is again filtered by the primary filter 31. The main purpose of this filter is to slow the flow of effluent in order to permit continued aerobic bacterial action to take place. In this manner the coliform bacteria is significantly reduced as well as the biological oxygen demand (b.o.d.) of the effluent. As is well known to those skilled in the art these two characteristics of effluent coming from septic tanks are the prime pollutants since coliform is the disease carrying bacteria while the degree of b.o.d. of the effluent is a measure of the oxygen in the effluent which in turn indicates whether fish or other aquatic life could survive in the effluent. In operation the sewage treatment system of the present invention has provided an effluent which is low in b.o.d. and coliform; so low in fact that the water discharged from this system is potable. Consequently, a reservoir of water which can be safely used for a multitude of purposes is provided by the present invention.

As noted previously the air which is necessary for the aerobic bacterial action is introduced above the first filter 27 via pipe 29. As the effluent descends from the first filter onto the final filter 31 and passes there through, the final filter acts to remove loose metallic ions while enabling the aerobic bacterial action to take place. The effluent collects at the bottom of filter 31 which also is the bottom of tank 19. It then flows into pipe 29 through holes 32 and then into holding tank 23. Preferably a layer of stones is placed on the bottom of tank 19 and a mesh screen is wrapped around the pipe 29 in the area of holes 32 to assure that the holes don't become clogged by the mixture which makes up the filter 31. In addition a layer of hay is placed on top of the stones to remove any trace of quantities of petroleum in the effluent. The filter mix 31 is then put on top of the hay. Since air flows up the pipe 29 when effluent is not being discharged into tank 23, this air pressure also aids in keeping holes 32 open and free of clogging debris.

A combination which has been found to work satisfactorily as the final filter 31 comprises 40% to 85% by volume of washed coarse silica sand together with 60% to 15% by volume of a suitable mixture of humus and alluvial deposits. Additional materials mixed in the filter composition can include clay and silicates (which sould be no greater than 10% by volume of the total mixture). It is desirable, although not necessary, to have organic neutralizing ingredients in the form of first stage decomposition, such as peat or lignite in the humus. In order to improve the absorption ability of the filter diatomaceous earth can be added in suitable amounts.

It was earlier mentioned that a significant drawback of conventional septic systems is that the effluent is discharged into a subsurface drainage field. As is well known, the bacterial action necessary to cleanse and filter such effluent is present only in the top layer of earth and to a depth of about 2 to 3 feet. As a result, since conventional drainage fields are over 3 feet below the earth's surface, there is little or no natural cleaning and filtering of the effluent. Consequently, the subsurface water table becomes polluted. Over a period of time the subsurface area in the vicinity of the drainage field can therefore become saturated with pollutants and the polluted subsurface waters, in turn, pollute the nearby lakes and streams. The present invention prevents such subsurface pollution.

The preferred composition of the final filter was given above. This filter is preferably about four feet deep and by the choice of elements which comprise the filter the natural cleansing and filtering action of the earth's soil is utilized to render the effluent a non-pollutant. Since the humus and alluvial deposits as well as all the other elements contained in the final filter are inexpensive and readily available, the filter therefore is not only efficient but also economical.

Figure 3:
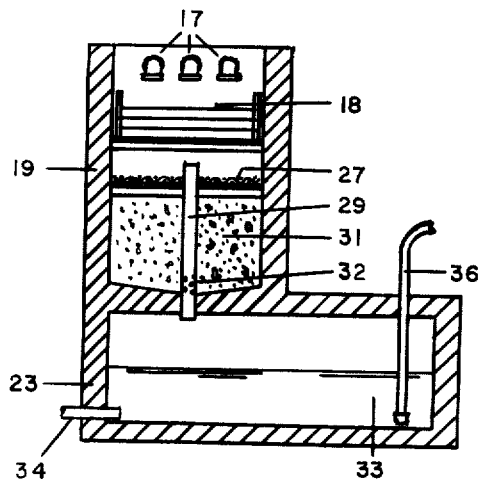
FIG. 3 is another elevational view of the structure taken along lines 3—3 of FIG. 2.

Referring to FIG. 3, the filter tank 19 and holding tank 23 are shown as viewed along lines 3—3 of FIG. 2. The elements in tank 19 previously described are again numbered as before. After the effluent has flowed through the final filter 31 it enters pipe 29 through holes 32 and is then discharged into the holding tank 23 where it is shown at 33. Pipe 34 is an air inlet pipe which is connected to an air compressor in order to aerate the holding tank. This aeration acts to stir the effluent and assure complete treatment of the effluent by aerobic bacterial action. Line 36 is connected to an electric water pump shown in FIG. 4. The pump may be operated by a manual switch or preferably conventional automatic switch means are provided whereby the pump is automatically turned on when the effluent 33 in tank 23 reaches a certain level. The effluent is pumped from tank 23 into a mixing tank 38. Chlorine from chlorinator 39 is introduced into the effluent at 50 prior to entering the water pressure tank 38. In order to achieve efficient chlorination, the chlorine is introduced at a 45°angle at point 40. The amount of chlorine present in the water is preferably in the range of 6 to 10 parts chlorine per million parts water. The chlorine is introduced to assure that the coliform content in the effluent is reduced to an acceptable level so that the water can be pumped to the surface and sprayed over the ground or used for other purposes without any danger to health.

Tank 38 is a standard glass-lined water supply tank and the chlorinated water flows under pressure from the tank into an underground sprinkler system depicted by the four lines 41. Each of these lines is connected to a sprinkler head 42 for spraying the water over the ground. In order to be certain that the sprinkler head does not freeze, the automatic self-draining valves 43 are provided so that water remaining in lines 41 at the end of a sprinkling cycle is able to drain into French drains and into the surrounding soil below the frost level.

Figure 4:
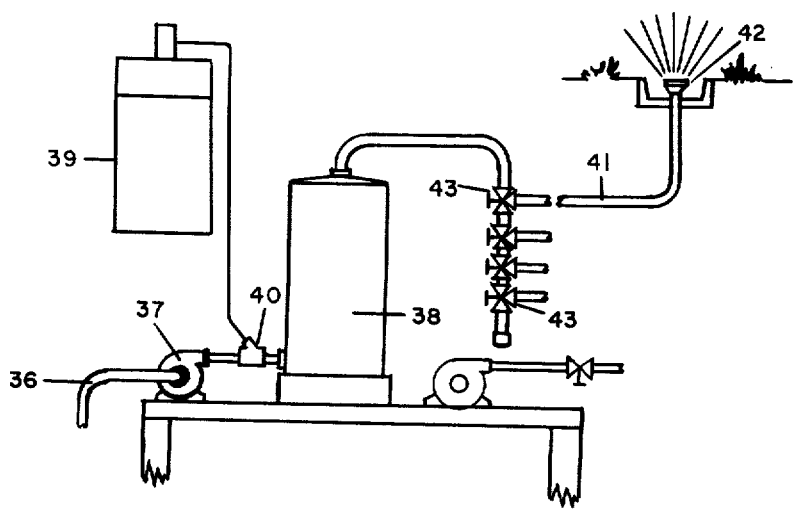
FIG. 4 depicts the water supply tank, air compressor and chlorinator which are accessory items of equipment.

It is also contemplated that the water from the water supply tank 38 could be recycled and used in the plumbing system of the house or building having the sewage treatment system of this invention. In practice, part of the holding tank 23 is under the building's foundation and the items shown in FIG. 4 are in the building's basement. This arrangement facilitiates construction of the pumping and chlorinating systems and permits easy access to tank 23. Also, it is then easy to connect the supply tank 38 to the building's plumbing system.

There has been described herein the preferred embodiment of this invention. It is recognized that details of arrangement and construction can be altered and that other changes to the system can be made which are within the intent and scope of this invention and the following claims.

For example, the system depicted in the figures illustrates a unitary structure of three containers or tanks. It is recognized that these containers can be separate tanks which are in fluid communication with each other, such as by pipes, wherein each tank is a separate structure. The structure disclosed in the figures is economical and compact but the particular arrangement of containers and the structure thereof is a matter of choice and can be varied without going outside the scope and intent of the invention.

What we claim is:

1. Sewage treatment apparatus comprising, in combination, a first container and a second container, inlet means in an upper portion of the sidewall of said first container, means for aerating liquid in said first container, outlet means in an upper portion of the sidewall of said first container oppositely spaced from said inlet, said outlet means comprising a conduit with a first open end located within said first container and a second open end located in and approximately centrally of said second container, fluid distributor structure comprising a trough with a bottom and sidewalls, said trough being located beneath said second open conduit end for the reception of fluid therefrom, downwardly sloping sidewalls peripherally arranged around said trough with the inner peripheral ends thereof in fluid communication with said trough whereby excess fluid received by said trough is caused to flow over the surfaces of said sloping sidewalls, apertures distributed in the surface of said sloping sidewalls with baffle structure adjacent thereto constructed and arranged to divert liquid into said apertures, first filter means comprising a perforated support means supporting filter media horizontally located within said second compartment beneath said apertures, second filter means comprising a mixture of sand, humus and alluvial deposites located within said second container beneath said first filter means, filtered fluid collection means located beneath said second filter means in fluid communication therewith, and means in fluid communication with said fluid collection means for the removal of filtered fluid therefrom.

2. The apparatus of claim 1 wherein said filtered fluid collection means comprises a third container and said means for removal of filtered fluid therefrom comprises a pump and a conduit assembly.

3. The apparatus of claim 2 wherein said pump and conduit assembly is further defined to comprise a conduit means for connecting said pump to said third container and a second conduit means connecting said pump to a sprinkler, said sprinkler being on the ground surface, and an automatic self-draining valve being located in said conduit means.

4. The apparatus of claim 1 wherein said support means of said first filter means is a screen and said filter media comprises a layer of organic materials with a layer of fiberglass.

5. The apparatus of claim 1 wherein clay, silicates, diatomaceous earth and organic neutralizing ingredients in the form of first stage decomposition are mixed with said sand, humus and alluvial deposites in said second filter means.

6. The apparatus of claim 1 wherein said sand is present in an amount ranging between 40% to 85% by volume and said humus and alluvial deposits are present together in an amount ranging between 60% and 15% by volume of said second filter means.

* * * * *